US012641577B2

(12) United States Patent
Yu et al.

(10) Patent No.: US 12,641,577 B2
(45) Date of Patent: May 26, 2026

(54) WIRELESS COMMUNICATION METHOD AND APPARATUS

(71) Applicant: Huawei Technologies Co., Ltd., Shenzhen (CN)

(72) Inventors: Yawei Yu, Shenzhen (CN); Zhiheng Guo, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 17/837,845

(22) Filed: Jun. 10, 2022

(65) Prior Publication Data

US 2022/0303989 A1     Sep. 22, 2022

Related U.S. Application Data

(63) Continuation of application No. PCT/CN2019/124834, filed on Dec. 12, 2019.

(51) Int. Cl.
*H04W 72/0446*     (2023.01)
*H04L 5/00*     (2006.01)
*H04L 25/02*     (2006.01)
*H04W 72/23*     (2023.01)

(52) U.S. Cl.
CPC ....... *H04W 72/0446* (2013.01); *H04L 5/0048* (2013.01); *H04L 25/0228* (2013.01); *H04W 72/23* (2023.01)

(58) Field of Classification Search
CPC .............. H04W 72/0446; H04W 72/23; H04L 5/0048; H04L 22/0228
See application file for complete search history.

(56) References Cited

U.S. PATENT DOCUMENTS

| | | | |
|---|---|---|---|
| 11,838,151 B1* | 12/2023 | Jones ................... | H04L 25/0224 |
| 2017/0202014 A1* | 7/2017 | Moon ................... | H04B 7/0626 |
| 2018/0083806 A1* | 3/2018 | Xing ..................... | H04W 28/04 |
| 2018/0109358 A1* | 4/2018 | Xing ..................... | H04W 28/04 |

(Continued)

FOREIGN PATENT DOCUMENTS

| | | |
|---|---|---|
| CN | 106788926 A | 5/2017 |
| CN | 108173633 A | 6/2018 |

(Continued)

OTHER PUBLICATIONS

"Summary of email Discussion for Rel. 17 enhancements on MIMO for NR," 3GPP TSG RAN Meeting #86, Sitges, Spain, RP-192435, Total 31 pages, 3rd Generation Partnership Project, Valbonne, France (Dec. 9-12, 2019).

(Continued)

*Primary Examiner* — Blake J Rubin

(74) *Attorney, Agent, or Firm* — Leydig, Voit & Mayer, Ltd.

(57) ABSTRACT

A method includes: sending first indication information to a terminal device, where the first indication information is used to indicate K consecutive time units, K is an integer greater than or equal to 2, and uplink data carried in at least two of the K time units is different; receiving a first uplink reference signal from the terminal device in at least one of the K time units; and performing joint channel estimation in the K time units based on the first uplink reference signal.

20 Claims, 4 Drawing Sheets

(56) References Cited

U.S. PATENT DOCUMENTS

| | | | | |
|---|---|---|---|---|
| 2019/0182009 | A1* | 6/2019 | Mondal | H04L 5/005 |
| 2019/0222380 | A1* | 7/2019 | Manolakos | H04L 25/0224 |
| 2020/0163059 | A1* | 5/2020 | Zhang | H04L 25/0226 |
| 2020/0235878 | A1* | 7/2020 | Yang | H04W 72/12 |
| 2020/0305168 | A1* | 9/2020 | Liou | H04W 76/11 |
| 2020/0389879 | A1* | 12/2020 | Zhang | H04L 5/0053 |
| 2021/0152305 | A1* | 5/2021 | Wei | H04L 5/0048 |
| 2022/0209922 | A1* | 6/2022 | Fei | H04L 5/0094 |
| 2022/0216973 | A1* | 7/2022 | Song | H04L 5/005 |
| 2022/0232603 | A1* | 7/2022 | Xiao | H04L 1/1861 |

FOREIGN PATENT DOCUMENTS

| | | | |
|---|---|---|---|
| CN | 110138525 | A | 8/2019 |
| WO | 2017172036 | A1 | 10/2017 |
| WO | 2018031623 | A1 | 2/2018 |
| WO | 2019075701 | A1 | 4/2019 |

OTHER PUBLICATIONS

"Overview of Rel-17 work areas for NR and LTE," 3GPP TSG RAN Meeting #84, Newport Beach, USA, RP-191486, Total 22 pages, 3rd Generation Partnership Project, Valbonne, France (Jun. 3-6, 2019).

China Telecom (Email discussion moderator), "Summary of Phase 2 email discussion on NR coverage enhancement," 3GPP TSG RAN Meeting #86, Sitges, Spain, RP-192562, total 19 pages, 3rd Generation Partnership Project, Valbonne, France (Dec. 9-12, 2019).

"3rd Generation Partnership Project; Technical Specification Group Radio Access Network; NR; Physical layer procedures for control (Release 15)," 3GPP TS 38.213 V15.7.0, total 108 pages, 3rd Generation Partnership Project, Valbonne, France (Sep. 2019).

Panasonic, "Discussion and performance evaluation on PUSCH coverage enhancement," 3GPP TSG RAN WG1 Meeting #80, Athens, Greece, R1-150312, total 6 pages, 3rd Generation Partnership Project, Valbonne, France (Feb. 9-13, 2015).

"3rd Generation Partnership Project; Technical Specification Group Radio Access Network; NR; Physical channels and modulation (Release 15)," 3GPP TS 38.211 V15.7.0, total 97 pages, 3rd Generation Partnership Project, Valbonne, France (Sep. 2019).

* cited by examiner

100

104 106 108

102

110 112 114

Network device

Terminal device

S210: Send first indication information, to indicate K consecutive time units

S220: Determine transmit parameters of uplink reference signals in the K time units S230: Send the uplink reference signals for joint channel estimation

700

710

720

WIRELESS COMMUNICATION METHOD AND APPARATUS

CROSS-REFERENCE TO RELATED APPLICATIONS

This application is a continuation of International Application No. PCT/CN2019/124834, filed on Dec. 12, 2019, the disclosure of which is hereby incorporated by reference in its entirety.

TECHNICAL FIELD

This application relates to the wireless communication field, and more specifically, to a wireless communication method and apparatus.

BACKGROUND

In wireless communication, a terminal device sends an uplink reference signal to a network device, and the network device performs uplink channel estimation based on the received uplink reference signal, and configures an appropriate scheduling parameter for uplink transmission of the terminal device. Therefore, accuracy of the uplink channel estimation greatly affects uplink transmission performance. For example, when the uplink reference signal is a demodulation reference signal (DMRS), if channel estimation is inaccurate, data carried on a physical uplink shared channel (PUSCH) cannot be correctly demodulated and received by the network device, and consequently an uplink transmission throughput is reduced, and spectral efficiency is low. When the uplink reference signal is a sounding reference signal (SRS), if channel estimation is inaccurate, the network device configures an inappropriate scheduling parameter for uplink transmission of the terminal device. For example, when channel quality is poor, the network device configures an excessively high modulation scheme or bit rate for the terminal device, and consequently data for uplink transmission cannot be correctly received by the network device. Alternatively, when channel quality is good, the network device configures an excessively low modulation scheme or bit rate for the terminal device, and consequently there is little valid information for uplink transmission, and uplink transmission efficiency is reduced. Therefore, it is quite important for system performance to ensure accurate channel estimation that is based on a reference signal.

In an existing radio access technology, in new radio (NR), the network device performs uplink channel estimation based on an uplink reference signal in a time unit. Consequently, there may be a problem that channel estimation is inaccurate due to a small quantity of reference signals. In addition, the reference signal is configured by using higher layer signaling, and cannot flexibly adapt to a change of an uplink transmission channel. Therefore, a manner in which channel estimation is more accurate and a reference signal is configured more flexibly needs to be proposed.

SUMMARY

This application provides a wireless communication method and apparatus, to improve accuracy of channel estimation.

According to a first aspect, a wireless communication method is provided. The method includes: sending first indication information to a terminal device, where the first indication information is used to indicate K consecutive time units, K is an integer greater than or equal to 2, and uplink data carried in at least two of the K time units is different; receiving a first uplink reference signal from the terminal device in at least one of the K time units; and performing joint channel estimation in the K time units based on the first uplink reference signal.

This technical solution is performed by a network device. Joint channel estimation is performed on a plurality of consecutive time units. Compared with channel estimation performed on a single time unit, more reference signals are available in a channel estimation process. Therefore, channel estimation is more accurate, and the network device can schedule an uplink transmission resource more appropriately based on a joint channel estimation value.

With reference to the first aspect, in some implementations of the first aspect, the at least two of the K time units carry the first uplink reference signal; and transmit parameters of uplink reference signals corresponding to the at least two time units are the same, and the transmit parameter includes at least one of the following parameters: transmit power, an antenna port, or a frequency domain resource.

When transmit parameters of uplink reference signals are the same, transmission paths corresponding to the uplink reference signals are the same. To be specific, uplink reference signals in each time unit correspond to a same transmission path, so that joint channel estimation can be performed.

With reference to the first aspect, in some implementations of the first aspect, positions of the K time units may be K consecutive time units starting from a first time unit, and the first time unit is a time unit that carries the first indication information. In this technical solution, the first time unit is used as start time of the joint channel estimation. Alternatively, the positions of the K time units may be K consecutive time units starting from a second time unit, and the second time unit and the first time unit are separated by N time units. A value of N is a predefined value, or is a value configured by the network side device. For example, the value of N may be configured by using RRC signaling. In this technical solution, the second time unit is used as start time of the joint channel estimation.

In this technical solution, channel estimation is performed by combining a plurality of time units. After receiving the first indication information, the terminal device may respond to the joint channel estimation, that is, send the uplink reference signal used for the joint channel estimation.

With reference to the first aspect, in some implementations of the first aspect, the first indication information includes information about a first modulation and coding scheme MCS, a value of K is a value that is indicated by a first mapping relationship and that corresponds to the first MCS, and the first mapping relationship is used to indicate a correspondence between a value of the MCS and the value of K.

In this technical solution, indication information used to indicate a quantity of K is implicitly included in the MCS. When receiving an MCS index value indicated by the first indication information, the terminal device may determine the quantity of K in the first mapping relationship based on the MCS index value. This reduces signaling overheads of the network device in a communication process.

With reference to the first aspect, in some implementations of the first aspect, the first indication information is carried in downlink control information DCI, and in addition, the method further includes: before sending the first indication information to the terminal device, sending second indication information to the terminal device, where the second indication information is used to indicate a value M, M is an integer greater than or equal to 2, the second indication information is carried in higher layer signaling, for example, RRC signaling, the first indication information includes first offset information, and the first offset information is used to indicate an offset of K relative to M.

In this technical solution, the value of K is determined by using both the higher layer signaling and the indication information in the DCI, and the network device preconfigures a value of M. In a communication process, the offset of K relative to M is dynamically configured by using the DCI as required, to flexibly and dynamically configure the quantity K of time units on which joint channel estimation needs to be performed. In addition, DCI indication overheads can be reduced, and system transmission efficiency can be improved. With reference to the first aspect, in some implementations of the first aspect, the method further includes: A part of the K time units carry an uplink reference signal.

In this technical solution, the network device configures a time domain symbol in the K time units, and may determine a quantity of the time domain symbols in the time units by using a quantity of reference symbols and an offset. In this manner, a time domain symbol that carries an uplink reference signal may be flexibly configured, and a part of the time units may be configured to carry the uplink reference signal. In this way, overheads of the uplink reference signal can be reduced.

With reference to the first aspect, in some implementations of the first aspect, the method further includes: sending third indication information to the terminal device, where the third indication information is used to indicate a time unit that is in the K time units and that carries an uplink reference signal; or the third indication information is used to indicate a time unit that is in the K time units and that does not carry an uplink reference signal.

In this technical solution, the network device may indicate the time unit that does not carry the uplink reference signal, or may indicate the time unit that carries the uplink reference signal, and the network device may flexibly configure the quantity of time units, to reduce signaling overheads.

With reference to the first aspect, in some implementations of the first aspect, the method further includes: sending fourth indication information to the terminal device, where the fourth indication information is used to indicate first transmit power, and the first transmit power is transmit power of the first uplink reference signal in all the K time units, that is, the uplink reference signal is sent in all the K time units by using the first transmit power.

With reference to the first aspect, in some implementations of the first aspect, the method further includes: The fourth indication information includes information about transmit power of each of the K time units.

With reference to the first aspect, in some implementations of the first aspect, the method further includes: sending fifth indication information to the terminal device, where the fifth indication information is used to indicate a first antenna port, and the first antenna port is a transmit port of the first uplink reference signal.

With reference to the first aspect, in some implementations of the first aspect, the method further includes: sending sixth indication information to the terminal device, where the sixth indication information is used to indicate a first frequency domain resource, and the first frequency domain resource is a frequency domain resource that carries the first uplink reference signal.

In this technical solution, the network device indicates, by using the fifth indication information and the sixth indication information, that uplink reference signals of the terminal device are sent through a same antenna port, and frequency domain resources of the uplink reference signals in all the time units are the same, to ensure that all the time units correspond to a same transmission link during joint channel estimation.

With reference to the first aspect, in some implementations of the first aspect, the method further includes: sending seventh indication information to the terminal device, where the seventh indication information is used to indicate a quantity of first symbols in the time unit that carries the first uplink reference signal, and the first symbol is a symbol used to carry the reference signal.

With reference to the first aspect, in some implementations of the first aspect, the method further includes: The seventh indication information includes second offset information, the second offset information is used to indicate an offset of the quantity of first symbols relative to a quantity of reference symbols, and the quantity of reference symbols is indicated by the network device, or the quantity of reference symbols is specified in a communication protocol.

With reference to the first aspect, in some implementations of the first aspect, the method further includes: The reference symbol is a symbol that is used to carry an uplink reference signal in a $j^{th}$ time unit in the K time units, and the $j^{th}$ time unit is any one of the K time units.

According to a second aspect, a wireless communication method is provided. The method includes: receiving first indication information from a network device, where the first indication information is used to indicate K consecutive time units, K is an integer greater than or equal to 2, at least one of the K time units is used to carry an uplink reference signal, and the uplink reference signal is used for joint channel estimation in the K time units; and sending a first uplink reference signal in the at least one of the K time units, where uplink data carried in at least two of the K time units is different.

The method is performed by a terminal device. After receiving the first indication information, the terminal device sends, to the network device, the uplink reference signal used for the joint channel estimation.

With reference to the second aspect, in some implementations of the second aspect, the at least two of the K time units carry the first uplink reference signal; and transmit parameters corresponding to uplink reference signals correspondingly carried in the at least two time units are the same, and the transmit parameter includes at least one of the following parameters: transmit power, an antenna port, or a frequency domain resource.

When transmit parameters of uplink reference signals are the same, transmission paths corresponding to the uplink reference signals are the same. To be specific, uplink reference signals in each time unit correspond to a same transmission path, so that joint channel estimation can be performed.

With reference to the second aspect, in some implementations of the second aspect, the uplink data carried in the at least two of the K time units is different.

With reference to the second aspect, in some implementations of the second aspect, positions of the K time units may be K consecutive time units starting from a first time unit, and the first time unit is a time unit that carries the first indication information. In this technical solution, the first time unit is used as start time of the joint channel estimation. Alternatively, the positions of the K time units may be K consecutive time units starting from a second time unit, and the second time unit and the first time unit are separated by N time units. A value of N is a predefined value, or is a value configured by the network side device. For example, the value of N may be configured by using RRC signaling. In this technical solution, the second time unit is used as start time of the joint channel estimation.

In this technical solution, time of the indication information is used as the start time of the joint channel estimation. In this technical solution, channel estimation is performed by combining a plurality of time units. After receiving the first indication information, the terminal device may respond to the joint channel estimation, that is, send the uplink reference signal used for the joint channel estimation.

With reference to the second aspect, in some implementations of the second aspect, the first indication information includes information about a first modulation and coding scheme MCS, a value of K is a value that is indicated by a first mapping relationship and that corresponds to the first MCS, and the first mapping relationship is used for a correspondence between a value of the MCS and the value of K.

In this technical solution, indication information used to indicate the value of K is implicitly included in the MCS. When receiving an MCS index value indicated by the first indication information, the terminal device may determine the value of K in the first mapping relationship based on the MCS index value. This reduces signaling overheads of the network device in a communication process.

With reference to the second aspect, in some implementations of the second aspect, the first indication information is carried in downlink control information DCI, and in addition, the method further includes:

before receiving the first indication information from the network device, receiving second indication information from the network device, where the second indication information is used to indicate a value M, M is an integer greater than or equal to 2, and the second indication information is carried in higher layer signaling; and the receiving first indication information from a network device includes: receiving the downlink control information DCI from the network device, where the DCI includes first offset information, and the value of K is determined based on the first offset information and M.

In this technical solution, the value of K is determined by using both the higher layer signaling and the indication information in the DCI, and the network device preconfigures a value of M. In a communication process, the offset of K relative to M is dynamically configured by using the DCI as required, to flexibly and dynamically configure the quantity K of time units on which joint channel estimation needs to be performed. In addition, DCI indication overheads can be reduced, and system transmission efficiency can be improved.

With reference to the second aspect, in some implementations of the second aspect, a part of the K time units carry an uplink reference signal.

With reference to the second aspect, in some implementations of the second aspect, the method further includes: receiving third indication information from the network device, where the third indication information is used to indicate a time unit that is in the K time units and that carries an uplink reference signal; or the third indication information is used to indicate a time unit that is in the K time units and that does not carry an uplink reference signal. With reference to the second aspect, in some implementations of the second aspect, the method further includes: receiving fourth indication information from the network device, where the fourth indication information is used to indicate first transmit power, and the first transmit power is transmit power of the first uplink reference signal, that is, the uplink reference signal is sent in all the K time units by using the first transmit power.

With reference to the second aspect, in some implementations of the second aspect, the fourth indication information includes information about transmit power of each of the K time units.

With reference to the second aspect, in some implementations of the second aspect, the method further includes: receiving fifth indication information from the network device, where the fifth indication information is used to indicate a first antenna port, and the first antenna port is a transmit port of the first uplink reference signal.

With reference to the second aspect, in some implementations of the second aspect, the method further includes: receiving sixth indication information from the network device, where the sixth indication information is used to indicate a first frequency domain resource, and the first frequency domain resource is a frequency domain resource that carries the first uplink reference signal.

In this technical solution, the network device indicates, by using the fifth indication information and the sixth indication information, that uplink reference signals of the terminal device are sent through a same antenna port, and frequency domain resources of the uplink reference signals in all the time units are the same, to ensure that all the time units correspond to a same transmission link during joint channel estimation.

With reference to the second aspect, in some implementations of the second aspect, the method further includes: receiving seventh indication information from the network device, where the seventh indication information is used to indicate a quantity of first symbols in the time unit that carries the first uplink reference signal, and the first symbol is a symbol used to carry the reference signal.

With reference to the second aspect, in some implementations of the second aspect, the seventh indication information includes second offset information, the second offset information is used to indicate an offset of the quantity of first symbols relative to a quantity of reference symbols, and the quantity of reference symbols is indicated by the network device, or the quantity of reference symbols is specified in a communication protocol.

With reference to the second aspect, in some implementations of the second aspect, the reference symbol is a symbol that is used to carry an uplink reference signal in a $j^{th}$ time unit in the K time units, and the $j^{th}$ time unit is any one of the K time units.

According to a third aspect, a wireless communication apparatus is provided. The apparatus includes: a transceiver unit, configured to send first indication information to a terminal device, where the first indication information is used to indicate K consecutive time units, K is an integer greater than or equal to 2, and uplink data carried in at least two of the K time units is different, where the transceiver unit is further configured to receive a first uplink reference signal from the terminal device in at least one of the K time units; and a processing unit, configured to perform joint channel estimation in the K time units based on the first uplink reference signal.

With reference to the third aspect, in some implementations of the third aspect, the at least two of the K time units carry the first uplink reference signal; and transmit parameters of uplink reference signals corresponding to the at least two time units are the same, and the transmit parameter includes at least one of the following parameters: transmit power, an antenna port, or a frequency domain resource.

With reference to the third aspect, in some implementations of the third aspect, positions of the K time units may be K consecutive time units starting from a first time unit, and the first time unit is a time unit that carries the first indication information. In this technical solution, the first time unit is used as start time of the joint channel estimation. Alternatively, the positions of the K time units may be K consecutive time units starting from a second time unit, and the second time unit and the first time unit are separated by N time units. A value of N is a predefined value, or is a value configured by the network side device. For example, the value of N may be configured by using RRC signaling. In this technical solution, the second time unit is used as start time of the joint channel estimation.

With reference to the third aspect, in some implementations of the third aspect, a part of the K time units carry an uplink reference signal.

With reference to the third aspect, in some implementations of the third aspect, the first indication information includes information about a first modulation and coding scheme MCS, a value of K is a value that is indicated by a first mapping relationship and that corresponds to the first MCS, and the first mapping relationship is used to indicate a correspondence between a value of the MCS and the value of K.

With reference to the third aspect, in some implementations of the third aspect, the first indication information is carried in downlink control information DCI, and before sending the first indication information to the terminal device, the transceiver unit is further configured to: send second indication information to the terminal device, where the second indication information is used to indicate a value M, M is an integer greater than or equal to 2, and the second indication information is carried in higher layer signaling; and send the downlink control information DCI to the terminal device, where the DCI includes first offset information, and the value of K is determined based on the first offset information and M.

With reference to the third aspect, in some implementations of the third aspect, the transceiver unit is further configured to: send third indication information to the terminal device, where the third indication information is used to indicate a time unit that is in the K time units and that carries an uplink reference signal; or the third indication information is used to indicate a time unit that is in the K time units and that does not carry an uplink reference signal.

With reference to the third aspect, in some implementations of the third aspect, the transceiver unit is further configured to: send fourth indication information to the terminal device, where the fourth indication information is used to indicate first transmit power, and the first transmit power is transmit power of the first uplink reference signal.

With reference to the third aspect, in some implementations of the third aspect, the fourth indication information includes information about transmit power of each of the K time units.

With reference to the third aspect, in some implementations of the third aspect, the transceiver unit is further configured to: send fifth indication information to the terminal device, where the fifth indication information is used to indicate a first antenna port, and the first antenna port is a transmit port of the first uplink reference signal.

With reference to the third aspect, in some implementations of the third aspect, the transceiver unit is further configured to: send sixth indication information to the terminal device, where the sixth indication information is used to indicate a first frequency domain resource, and the first frequency domain resource is a frequency domain resource that carries the first uplink reference signal.

With reference to the third aspect, in some implementations of the third aspect, the transceiver unit is further configured to: send seventh indication information to the terminal device, where the seventh indication information is used to indicate a quantity of first symbols in the time unit that carries the first uplink reference signal, and the first symbol is a symbol used to carry the reference signal.

With reference to the third aspect, in some implementations of the third aspect, the seventh indication information includes second offset information, the second offset information is used to indicate an offset of the quantity of first symbols relative to a quantity of reference symbols, and the quantity of reference symbols is indicated by the network device, or the quantity of reference symbols is specified in a communication protocol.

With reference to the third aspect, in some implementations of the third aspect, the quantity of reference symbols is a quantity of symbols that are used to carry an uplink reference signal in a $j^{th}$ time unit in the K time units, and the $j^{th}$ time unit is any one of the K time units.

With reference to the third aspect, in some implementations of the third aspect, a part of the K time units carry an uplink reference signal.

According to a fourth aspect, a wireless communication apparatus is provided. The apparatus includes: a transceiver unit, configured to receive first indication information from a network device, where the first indication information is used to indicate K consecutive time units, K is an integer greater than or equal to 2, at least one of the K time units is used to carry an uplink reference signal, and the uplink reference signal is used for joint channel estimation in the K time units, where the transceiver unit is further configured to send a first uplink reference signal in the at least one of the K time units, where uplink data carried in at least two of the K time units is different.

With reference to the fourth aspect, in some implementations of the fourth aspect, the at least two of the K time units carry the first uplink reference signal; and transmit parameters of uplink reference signals corresponding to the at least two time units are the same, and the transmit parameter includes at least one of the following parameters: transmit power, an antenna port, or a frequency domain resource.

With reference to the fourth aspect, in some implementations of the fourth aspect, positions of the K time units may be K consecutive time units starting from a first time unit, and the first time unit is a time unit that carries the first indication information. In this technical solution, the first time unit is used as start time of the joint channel estimation. Alternatively, the positions of the K time units may be K consecutive time units starting from a second time unit, and the second time unit and the first time unit are separated by N time units. A value of N is a predefined value, or is a value configured by the network side device. For example, the value of N may be configured by using RRC signaling. In this technical solution, the second time unit is used as start time of the joint channel estimation.

With reference to the fourth aspect, in some implementations of the fourth aspect, the first indication information includes information about a first modulation and coding scheme MCS, a value of K is a value that is indicated by a first mapping relationship and that corresponds to the first MCS, and the first mapping relationship is used to indicate a correspondence between a value of the MCS and the value of K.

With reference to the fourth aspect, in some implementations of the fourth aspect, the first indication information is carried in downlink control information DCI, and before receiving the first indication information from the network device, the transceiver unit is further configured to: receive second indication information from the network device, where the second indication information is used to indicate a value M, M is an integer greater than or equal to 2, the second indication information is carried in higher layer signaling, the first indication information includes first offset information, and the first offset information is used to indicate an offset of K relative to M.

With reference to the fourth aspect, in some implementations of the fourth aspect, a part of the K time units carry an uplink reference signal.

With reference to the fourth aspect, in some implementations of the fourth aspect, the transceiver unit is further configured to: receive third indication information from the network device, where the third indication information is used to indicate a time unit that is in the K time units and that carries an uplink reference signal; or the third indication information is used to indicate a time unit that is in the K time units and that does not carry an uplink reference signal.

With reference to the fourth aspect, in some implementations of the fourth aspect, the transceiver unit is further configured to: receive fourth indication information from a network device, where the fourth indication information is used to indicate first transmit power, and the first transmit power is transmit power of the first uplink reference signal.

With reference to the fourth aspect, in some implementations of the fourth aspect, the fourth indication information includes information about transmit power of each of the K time units.

With reference to the fourth aspect, in some implementations of the fourth aspect, the transceiver unit is further configured to: receive fifth indication information from the network device, where the fifth indication information is used to indicate a first antenna port, and the first antenna port is a transmit port of the first uplink reference signal.

With reference to the fourth aspect, in some implementations of the fourth aspect, the transceiver unit is further configured to: receive sixth indication information from the network device, where the sixth indication information is used to indicate a first frequency domain resource, and the first frequency domain resource is a frequency domain resource that carries the first uplink reference signal.

With reference to the fourth aspect, in some implementations of the fourth aspect, the transceiver unit is further configured to: receive seventh indication information from the network device, where the seventh indication information is used to indicate a quantity of first symbols in the time unit that carries the first uplink reference signal, and the first symbol is a symbol used to carry the reference signal.

With reference to the fourth aspect, in some implementations of the fourth aspect, the seventh indication information includes second offset information, the second offset information is used to indicate an offset of the quantity of first symbols relative to a quantity of reference symbols, and the quantity of reference symbols is indicated by the network device, or the quantity of reference symbols is specified in a communication protocol.

With reference to the fourth aspect, in some implementations of the fourth aspect, the quantity of reference symbols is a quantity of symbols that are used to carry an uplink reference signal in a $j^{th}$ time unit in the K time units, and the $j^{th}$ time unit is any one of the K time units.

According to a fifth aspect, a communication apparatus is provided. The communication apparatus includes modules or units configured to perform the method according to any one of the first aspect or the third aspect and the possible implementations of the first aspect or the third aspect.

According to a sixth aspect, a wireless communication apparatus is provided. The wireless communication apparatus includes a processor. The processor is coupled to a memory, and may be configured to perform the method according to any one of the first aspect or the third aspect and the possible implementations of the first aspect or the third aspect. Optionally, the wireless communication apparatus further includes the memory. Optionally, the wireless positioning apparatus further includes a communication interface, and the processor is coupled to the communication interface. Optionally, the apparatus further includes a communication interface, and the processor is coupled to the communication interface.

In an implementation, the wireless communication apparatus is a network device. When the communication apparatus is the network device, the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, a communication apparatus is provided. The communication apparatus includes modules or units configured to perform the method according to any one of the second aspect or the fourth aspect and the possible implementations of the second aspect or the fourth aspect.

According to an eighth aspect, a communication apparatus is provided. The communication apparatus includes a processor. The processor is coupled to a memory, and may be configured to execute instructions in the memory, to implement the method according to any one of the second aspect or the fourth aspect and the possible implementations of the second aspect or the fourth aspect. Optionally, the communication apparatus further includes the memory. Optionally, the communication apparatus further includes a communication interface, and the processor is coupled to the communication interface. Optionally, the transceiver may be a transceiver circuit. Optionally, the input/output interface may be an input/output circuit.

In an implementation, the communication apparatus is a terminal device. When the communication apparatus is the terminal device, the communication interface may be a transceiver or an input/output interface. Optionally, the transceiver may be a transceiver circuit. Optionally, the input/output interface may be an input/output circuit.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, a processor is provided. The processor includes an input circuit, an output circuit, and a processing circuit. The processing circuit is configured to receive a signal through the input circuit, and transmit a signal through the output circuit, so that the method according to any one of the first aspect to the fourth aspect and any one of the possible implementations of the first aspect to the fourth aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a tenth aspect, a processing apparatus is provided. The processing apparatus includes a processor and a memory. The processor is configured to: read instructions stored in the memory; receive a signal through a receiver; and transmit a signal through a transmitter, to perform the method according to any one of the first aspect to the fourth aspect and the possible implementations of the first aspect to the fourth aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processor according to the tenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to an eleventh aspect, a computer program product is provided. The computer program product includes a computer program (which may also be referred to as code or an instruction). When the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or an instruction). When the computer program is run on a computer, the computer is enabled to perform the method according to any one of the first aspect to the fourth aspect and the possible implementations of the first aspect to the fourth aspect.

According to a thirteenth aspect, a communication system is provided. The communication system includes the foregoing network device and terminal device.

DESCRIPTION OF EMBODIMENTS

The following describes technical solutions of this application with reference to the accompanying drawings.

The technical solutions of embodiments of this application may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio access technology (NR) system.

Figure 1:
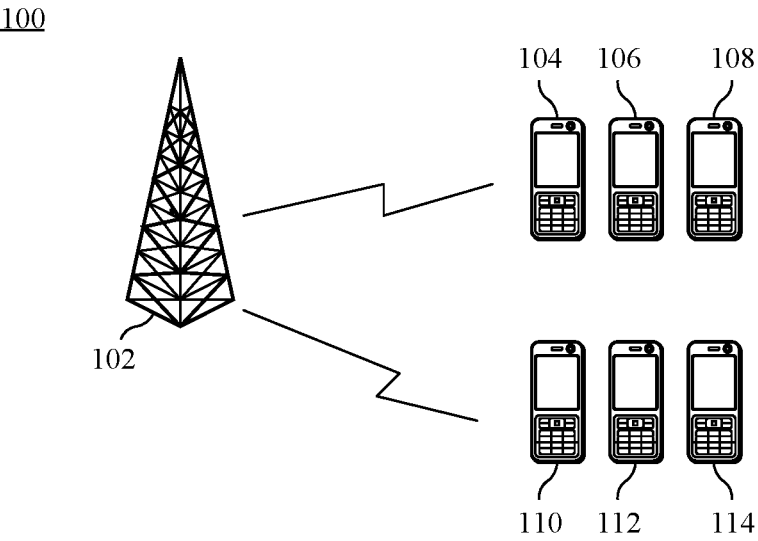
FIG. 1 shows an application scenario according to an embodiment of this application.

To facilitate understanding of embodiments of this application, a communication system to which embodiments of this application are applicable is first described in detail with reference to FIG. 1. FIG. 1 is a schematic diagram of a communication system 100 to which a reference signal sending and receiving method according to an embodiment of this application is applicable. As shown in FIG. 1, the communication system 100 may include a network device 102 and terminal devices 104 to 114.

It should be understood that the network device 102 may be any device having a wireless transceiver function or a chip that may be disposed in the device. The device includes but is not limited to a base station (for example, a NodeB, an evolved NodeB (eNodeB), a network device in a 5th generation (5G) communication system (such as a transmission point (TP), a transmission reception point (TRP), a base station, or a small cell device), a network device in a future communication system, an access node in a wireless fidelity (WiFi) system, a wireless relay node, a wireless backhaul node, and the like.

The network device 102 may communicate with a plurality of terminal devices (for example, the terminal devices 104 to 114 shown in the figure).

It should be understood that the terminal device may also be referred to as a user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. In this application, the foregoing terminal device and a chip that may be disposed in the terminal device are collectively referred to as a terminal device.

In addition, the communication system 100 may alternatively be a public land mobile network (PLMN) network, a device-to-device (D2D) network, a machine-to-machine (M2M) network, or another network. FIG. 1 is only a simplified schematic diagram of an example for ease of understanding, and the communication system 100 may further include another network device and another terminal device that are not shown in FIG. 1.

To facilitate understanding of embodiments of this application, the following briefly describes channel estimation during uplink transmission.

An NR protocol defines an uplink reference signal, for example, a demodulation reference signal (DMRS) and a sounding reference signal (SRS), used to estimate an uplink transmission channel, and channel estimation performed by the network device based on the uplink reference signal greatly affects uplink transmission performance.

The DMRS and the SRS are used as an example. When estimation of the DMRS is inaccurate, the network device cannot correctly demodulate received data carried on a physical uplink shared channel (PUSCH). As a result, uplink transmission throughput reduces and spectral efficiency is low. When estimation performed by the network device based on the SRS is inaccurate, a scheduling parameter used by the network device to indicate the terminal device to perform uplink transmission may be inappropriate. For example, a modulation and coding scheme (MCS) used to schedule PUSCH transmission is inaccurate. When channel quality is poor, the terminal device may be indicated to use an excessively high modulation scheme/bit rate, and consequently decoding and demodulation fail when the network device receives the PUSCH. Alternatively, when channel quality is good, an excessively low modulation scheme/bit rate is used, and consequently there is little valid information for PUSCH transmission, and transmission efficiency is reduced. Therefore, it is quite important for system performance to ensure accurate channel estimation based that is on a reference signal.

During uplink transmission, power control is quite important for transmission of an uplink reference signal. When channel quality of uplink transmission is poor, for example, a path loss is large because the terminal device performs uplink propagation at a long distance, or interference is large when the network device receives the uplink reference signal, the network device needs to indicate (which may also be referred to as "configure" below) the terminal device to perform uplink sending at high uplink reference signal power, to effectively receive the uplink reference signal.

Generally, when the network device performs power control on the uplink reference signal, the following formula needs to be satisfied:

$$P = \min\{P_{cmax}\{P_0(j) + \alpha(j) * P_L(p)\} + \{f(l)\} + \{10 \lg M + \Delta\}\},$$

where $\{P_0(j) + \alpha(j) * P_L(p)\}$ is an open-loop working point, $\{f(l)\}$ is a closed-loop offset, and $\{10 \lg M + \Delta\}$ is another adjustment value.

Usually, the open-loop working point part is configured by using higher layer signaling. The higher layer signaling may be RRC signaling, and is applicable to a plurality of time units. The closed-loop offset is configured by using downlink control information (DCI), and is used to quickly adjust power of the uplink reference signal. In the another adjustment value, M represents a quantity of physical resource blocks PRBs occupied by the current uplink transmission. In this case, the uplink reference signal is a subcarrier spacing of 15 kHz by default. The open-loop working point includes path loss information obtained after the terminal device performs channel estimation on a downlink reference signal sent by the network device. The network device performs power compensation on a path loss value, and performs power adjustment in a slow semi-persistent manner. The closed-loop offset is a value obtained by the network device performing fast and accurate adjustment based on quality of an uplink signal received in a previous transmission process. For example, when uplink transmit power received by the network device last time is excessively small, the network device may indicate, by using the closed-loop adjustment value, the terminal device to perform sending at higher power during the current uplink transmission.

For example, when the uplink reference signal is an SRS, for $P_L(p)$ in an open-loop working point, namely, path loss estimation of the open-loop working point, generally, a related reference signal is indexed by using a value of P configured by using a higher layer parameter pathlossReferenceSignal to calculate a path loss. When the higher layer parameter is not configured (for example, the terminal device has not accessed a system), the terminal device directly uses a reference signal in a synchronization signal block to calculate the path loss.

For example, when the uplink reference is a DMRS, for $P_L(p)$ in an open-loop working point, namely, path loss estimation of the open-loop working point, the following configuration is used. When no higher layer parameter pathlossReferenceSignal is configured for the terminal device, the terminal device calculates a path loss based on a reference signal in a synchronization signal block. When the higher layer parameter pathlossReferenceSignal is configured for the terminal device, a specific reference signal is directly indexed by using a higher layer parameter pusch-pathlossReferenceSignal-Id to calculate the path loss. When the PUSCH is transmitted by using a msg3, the terminal device calculates the path loss by using a reference signal that is the same as that sent on a PRACH. When the terminal device configures a higher layer parameter SRI-PUSCH-PowerControl and a plurality of values of pusch-pathloss-ReferenceSignal-Id, a corresponding downlink reference signal needs to be indexed from a configured mapping relationship by using an SRI in the DCI to calculate the path loss.

For non-codebook PUSCH/DMRS transmission, the terminal device needs to select, based on a quantity of layers for transmission of data and a quantity of SRS resources configured by the network device, at least one antenna port for PUSCH transmission by using an SRI index indication, and calculate a path loss based on a path loss value of the antenna port.

As shown in Table 1, for example, the quantity of layers for transmission is 1, and a DCI format is 0_1. The terminal device determines, by using the index table, the antenna port for transmission of the PUSCH/DMRS.

For example, when $N_{SRS}=2$, the terminal device may send the PUSCH/DMRS through two antenna ports. In addition, the network device may indicate, by using an SRI index value, the terminal device to send the PUSCH/DMRS through a specific antenna port. When the SRI index value is 0, the terminal device sends the PUSCH/DMRS through an antenna port corresponding to the first SRS resource (an SRS resource 0). Correspondingly, the terminal device calculates the path loss based on a path loss value of the first antenna port. When the SRI index value is 1, the terminal device sends the PUSCH/DMRS through an antenna port corresponding to the second SRS resource (an SRS resource 1). Correspondingly, the terminal device calculates the path loss based on a path loss value of the second antenna port.

TABLE 1

| SRI index table of non-codebook PUSCH/DMRS transmission (where the quantity of layers for transmission = 1) | | | | | |
|---|---|---|---|---|---|
| SRI index value | SRI, and $N_{SRS} = 2$ | SRI index value | SRI, and $N_{SRS} = 3$ | SRI index value | SRI, and $N_{SRS} = 4$ |
| 0 | 0 | 0 | 0 | 0 | 0 |
| 1 | 1 | 1 | 1 | 1 | 1 |
|   |   | 2 | 2 | 2 | 2 |
|   |   | 3 | Reserved (Reserved) | 3 | 3 |

For power adjustment of a closed-loop offset, when the network device finds that power of an uplink signal transmitted by the terminal device in a specific time unit is excessively high, when the network device schedules transmission of an uplink signal of a same type next time, for example, DCI is used to indicate the terminal device to reduce the power of the transmitted uplink signal by 1 dB, in the DCI, information used to indicate the terminal device to quickly adjust power is referred to as a transmit power control command (TPC-command). Generally, the TPC-command has two bits. For example, when the field is 00, and a value of TPC-Accumulation in higher layer signaling is 1, that is, TPC-Accumulation is enabled, the terminal device reduces the power by 1 dB based on a previous closed-loop adjustment value for transmission of a same type. When the value of TPC-Accumulation is 0, that is, TPC-Accumulation is disabled, a closed-loop adjustment value of the terminal device in the current time unit is reduced by 4 dB. Similarly, when the field is 01, 10, or 11, values of the closed-loop power adjustment value are different.

Generally, in open-loop parameters, $P_O(j)$ and $\alpha(j)$ and are configured in pairs. A total of 32 sets may be configured, and are included in a P0-PUSCH-AlphaSet parameter of the higher layer signaling. Values of $P_O(j)$ and $\alpha(j)$ are selected from configured P0-PUSCH-AlphaSet based on a p0-PUSCH-AlphaSetId index. The terminal device performs downlink path loss estimation based on the index value in the path loss estimation $P_L(p)$ of the open-loop working point. The path loss estimation of downlink transmission is uplink path loss estimation in the current time unit, and a parameter related to the path loss estimation is PUSCH-PathlossReferenceRS. For example, the terminal device learns of the value of p from PUSCH-PathlossReferenceRS-Id in SRI-PUSCH-PowerControl, and performs path loss measurement on the reference signal whose index value is p.

The value of TPC-Accumulation in the higher layer parameter determines the closed-loop power parameter $\{f(l)\}$. For example, when TPC-Accumulation is enabled, that is, TPC-Accumulation is 1, if an index value j of a part of parameters of the open-loop working point is 1, a value of $\{f(l)\}$ is indicated by using a higher layer parameter powerControlLoopToUse. When TPC-Accumulation is disabled, that is, TPC-Accumulation is 0, a value of $\{f(l)\}$ is obtained according to an indication of the TPC-command.

In addition to the transmit power, in NR, a time-frequency resource of the uplink reference signal is further configured by using the higher layer signaling. In other words, the terminal device determines the time-frequency resource of the uplink reference signal by using configured values of different fields in the higher layer signaling. The time-frequency resource means distribution of a time domain resource and distribution of a frequency domain resource in a time unit. The distribution of the frequency domain resource may be determined by using parameters such as a start position of the frequency domain resource, an offset of a frequency domain subcarrier, an offset of a frequency domain sequence, and whether frequency hopping is performed based on the frequency domain sequence. The distribution of the time domain resource may be determined by using parameters such as a start position of a time domain symbol and a quantity of time domain symbols.

Generally, fields in the higher layer signaling include: nrofSymbols, namely, a quantity of time domain symbols, where in an example in which the uplink reference signal is an SRS, a quantity of time domain symbols occupied in each time unit may be 1, 2, or 4; startPosition, namely, a start position of the time domain symbol; freqDomainPosition, namely, a position of a frequency domain symbol; freqDomainShift, namely, an offset of a frequency domain subcarrier; transmissionComb, namely, an offset of a frequency domain sequence; resourceType, namely, an uplink reference signal resource configuration type, which may be periodic, aperiodic, or semi-persistent; and groupOrSequenceHopping, namely, an uplink reference signal frequency hopping mode, where frequency hopping may be not performed, frequency hopping may be performed based on a time domain sequence, and so on.

Figure 2:
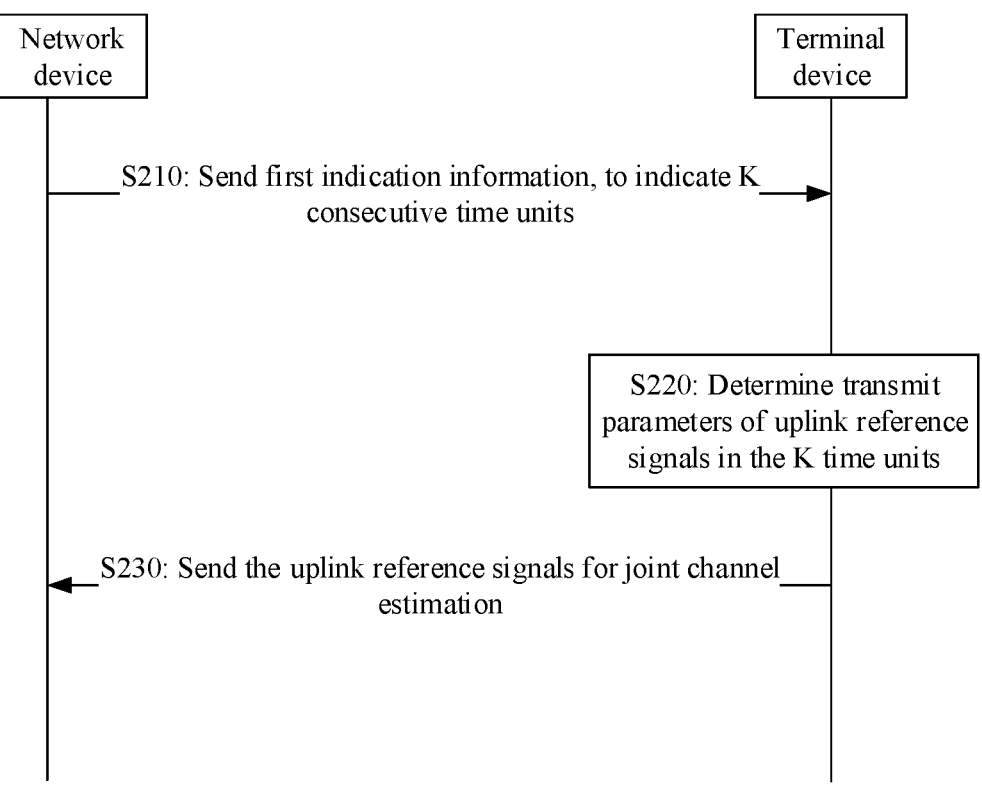
FIG. 2 is a schematic diagram of a wireless communication process according to an embodiment of this application.

The foregoing describes the transmit parameter of the uplink reference signal. With reference to FIG. 2, the following describes in detail technical solutions for joint channel estimation in a plurality of consecutive time units according to embodiments of this application.

S210: Send first indication information, to indicate K consecutive time units.

This step is performed by a network device, and is used to indicate a terminal device to send uplink reference signals in the K consecutive time units after the terminal device receives the indication information.

The indication information may be periodic indication information, or may be trigger indication information.

The indication information may include a position of a start moment of the K consecutive time units.

The position of the start moment may be a current moment at which the indication information is sent.

Alternatively, the position of the start moment may be a position of a moment after a moment at which the indication information is sent.

Alternatively, the position of the start moment may be a position obtained based on a position of the current moment and an offset. For example, the position of the start moment may be a position of a moment after the current moment plus the offset, and the offset may be indicated by the indication information, or may be preconfigured in a protocol. This is not specifically limited in this application. The following provides detailed descriptions with reference to a specific reference signal. Details are not described herein.

The terminal device sends uplink reference signals at same power in all the K consecutive time units, and the uplink reference signals in all the time units are associated with a same frequency domain resource and a same antenna port, to ensure that the uplink reference signals in the K consecutive time units correspond to a same uplink transmission channel. In this way, after receiving the uplink reference signals sent by the terminal device in the K consecutive time units, the network device can perform joint estimation on the channel in the K consecutive time units.

The network device indicates the K consecutive time units by using the indication information, and may perform joint channel estimation on the uplink transmission channel in the K consecutive time units. Compared with an uplink transmission channel estimation method in a single time unit, the network device can perform more accurate channel estimation in the technical solution provided in this embodiment of this application. In this way, uplink transmission resources are scheduled more appropriately, and uplink transmission efficiency is improved. In addition, when reciprocity of uplink and downlink channels is satisfied (that is, fading characteristics of uplink and downlink transmission channels are the same), more accurate uplink channel estimation also helps a network side perform more appropriate downlink transmission resource scheduling, and improves downlink transmission efficiency.

In this step, there may be a plurality of configuration methods. For example, K may be configured by using a related field in higher layer signaling, or K may be configured by using a related field in downlink control information. The following provides detailed descriptions with reference to a specific reference signal. Details are not described herein. The time unit in this step may be a slot slot or a sub-slot sub-slot. This is not specifically limited in this application.

S220: Determine transmit parameters of the uplink reference signals in the K time units.

When the network device performs joint channel estimation in the K consecutive time units for uplink transmission, in each of the K consecutive time units, the terminal device needs to use same transmit power (namely, first transmit power), a same antenna port (namely, a first antenna port), and a same frequency domain resource (namely, a first frequency domain resource) to send the uplink reference signal to the network device. In other words, when the uplink reference signals in all the time units have same transmit power, a same transmit antenna port, and a same frequency domain resource, it can be ensured that the uplink reference signals in all the time units correspond to a same transmission path. In this way, it can be ensured that the network device performs joint channel estimation in the K consecutive time units.

For example, the network side sends the uplink reference signals in the K time units through a same antenna port at same transmit power. Optionally, frequency domain resources in the K time units may be the same. To be specific, the network side performs channel estimation on the uplink reference signals in the K time units on a same subcarrier/frequency domain, to improve accuracy of the channel estimation. Optionally, frequency domain resources of the K time units may be different. To be specific, the network side performs channel estimation on the uplink reference signals in the K time units on different subcarriers, to perform channel estimation within a wider bandwidth range. This helps a base station perform uplink scheduling transmission on a frequency domain carrier with good quality for the terminal on a frequency selective fading channel.

It should be understood that, when the network device performs joint channel estimation, the network device may send the indication information, to indicate the first transmit power, the first antenna port, and the first frequency domain resource of the uplink reference signals. Alternatively, the first transmit power, the first antenna port, and the first frequency domain resource may be pre-specified by the network device in a communication protocol. When the terminal device receives the first indication information, the terminal device uses the same transmit power (namely, the first transmit power), the same antenna port (namely, the first antenna port), and the same frequency domain resource (namely, the first frequency domain resource) to send the uplink reference signals to the network device.

The first transmit power of the uplink reference signals indicated by the network device in the K consecutive time units may be indicated by using the higher layer signaling, or may be indicated by using the field in the downlink control information. The first antenna port of the uplink reference signals indicated by the network device in the K consecutive time units may be indicated by using the field in the downlink control information. The first frequency domain resource of the uplink reference signals indicated by the network device in the K consecutive time units may be indicated by using the higher layer signaling.

The network device may further indicate a time domain resource of the uplink reference signals in the K consecutive time units. The network device indicates the time domain resource of the uplink reference signals in a plurality of manners. For example, the network device may configure the time domain resource of the uplink reference signals in the K consecutive time units by using higher layer signaling, or may configure the time domain resource by using a field related to an uplink reference signal in downlink control information DCI. This is not specifically limited in this application.

It should be noted that in the K time units, the uplink reference signal may be carried in each time unit, or the uplink reference signal may be carried in a part of the time units. This is not specifically limited in this application. The time domain resource described herein includes a quantity of time domain symbols, a start position of the time domain symbol, and a pattern of the time domain symbol. For example, the network device may configure a quantity of reference symbols, to indicate a quantity of symbols in the time domain symbols in the K time units, and configure an offset, to indicate an actual quantity of time domain symbols occupied by the reference signals included in the K time units. The quantity of reference symbols may be configured by the network device, or may be pre-specified in the communication protocol. The network device may further indicate the terminal device not to carry a reference signal in a specific time unit in the K time units.

The following provides detailed descriptions with reference to a specific reference signal. Details are not described herein. The time unit described in this application may be a slot slot or a sub-slot sub-slot. This is not specifically limited herein.

S230: Send the uplink reference signals for joint channel estimation.

After receiving the indication information from the network device, the terminal device sends the uplink reference signals to the network device based on the indication information or according to a stipulation in the communication protocol, and the network device performs joint channel estimation in the K time units based on the uplink reference signals.

The foregoing describes in detail the technical solution for joint channel estimation provided in this application. After the foregoing steps, the network device may perform joint channel estimation on the uplink transmission channel in the K consecutive time units, so that a channel estimation value is more accurate than an uplink transmission channel estimation value for a single time unit. In addition, a part of the K time units may carry an uplink transmission signal, and a configuration manner is flexible. Therefore, the network device can perform more appropriate uplink and downlink transmission scheduling, to improve uplink transmission efficiency of the terminal device.

Figure 3:
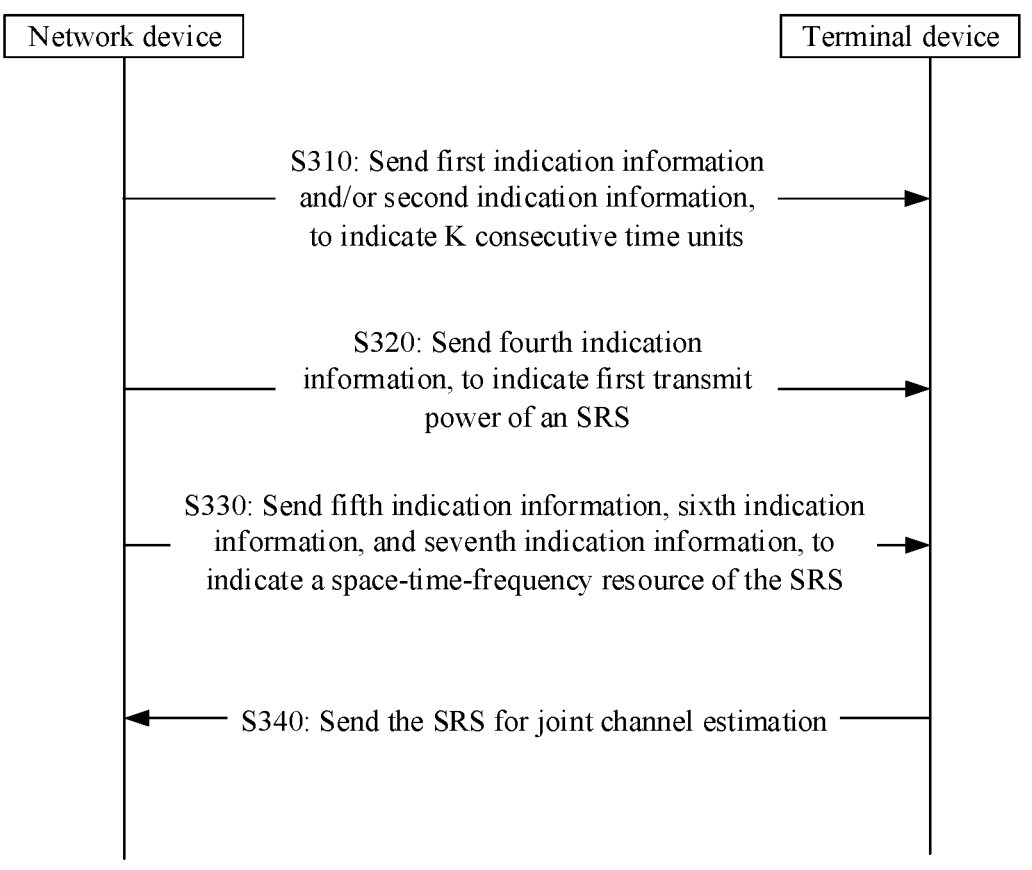
FIG. 3 is another schematic diagram of a wireless communication process according to an embodiment of this application.

With reference to FIG. 3, the following describes in detail the technical solutions in embodiments of this application by using an example in which an uplink reference signal is an SRS and higher layer signaling is RRC signaling.

S310: Send first indication information and/or second indication information, to indicate K consecutive time units.

This step is performed by a network device, and is used to indicate a terminal device to send uplink reference signals in the K consecutive time units after the terminal device receives the indication information. The indication information may be periodic indication information, or may be trigger indication information.

The indication information may include a position of a start moment of the K consecutive time units. The start moment may be a position of a current moment at which the indication information is sent (Manner A for short below), or may be a position of a moment after a moment at which the indication information is sent (Manner B for short below). The position of the moment may be configured by the network device, or may be predefined in a communication protocol. This is not specifically limited in this application.

Manner A

An indication field is configured in RRC signaling. The field is used to indicate that the position of the start moment of the K consecutive time units is the position of the current moment. For example, the field may be 0. It should be noted that the indication field may be indicated by the network device, or may be specified in the communication protocol. This is not specifically limited in this application.

Manner B

An indication field is configured in RRC signaling. The field is used to indicate that the position of the start moment of the K consecutive time units is the position of the moment after the moment at which the indication information is sent. For example, the field may be 00, and is used to indicate that one time unit after the current moment is the position of the start moment of the K consecutive time units. For example, the field may be 01, and is used to indicate that two time units after the current moment are the position of the start moment of the K consecutive time units. The indication field may be indicated by the network device, or may be specified in the communication protocol. This is not specifically limited in this application.

In addition, a method in which the network device sends the first indication information, to indicate the K consecutive time units may be carried in the RRC signaling. An indication field is configured by using the RRC signaling, to indicate a quantity of K consecutive time units (Manner 1 for short below). Alternatively, the first indication information may be carried in DCI, to indicate a quantity of K consecutive time units (Manner 2 for short below), for example, the indication field is configured in the DCI, to indicate the quantity of K consecutive time units (Manner 2.1 for short below). Alternatively, a redundant field in the DCI may be reused, to indicate the quantity of K consecutive time units (Manner 2.2 for short below). Alternatively, an associated implicit indication may be performed by using an existing field in the DCI. In this case, an additional trigger is required, that is, the terminal is indicated to perform new interpretation on the existing field, where the additionally triggered signaling may be a parameter configured by using the higher layer signaling, for example, 'MultiSlotFlag=1' (Manner 2.3 for short below). Alternatively, an indication field may be first configured in the RRC signaling, to indicate a quantity of N consecutive time units, and then an indication field is configured in the DCI, to indicate a quantity to be added to or reduced from a reference of the quantity of N consecutive time units, to determine a quantity of K consecutive time units (Manner 3 for short below). It should be noted that, when the DCI indicates a value of K, the value of K indicated in the DCI is used; or when the DCI does not indicate a value of K, the value K=N configured by using the RRC signaling is used. The time unit in this step may be a slot slot or a sub-slot sub-slot. This is not specifically limited in this application.

Manner 1

The indication field is configured in the RRC signaling, and a value of the indication field indicates the quantity K of time units for transmission of an SRS performed by the terminal device. For example, the value of K may be 4, 5, or another positive integer. This is not specifically limited in this application.

Manner 2

The quantity of K time units is indicated by using the DCI. For example, the quantity of K time units may be indicated by using the DCI in the following two specific manners.

Manner 2.1

An indication field used to indicate the quantity of K consecutive time units is configured in the DCI. For example, a new field is added to the DCI to indicate the value of K. When the DCI field is 11, it indicates that K=4, namely, four consecutive time units. When the DCI field is 111, it indicates that K=8, namely, eight consecutive time units.

Alternatively, as shown in Table 2, for example, a 2-bit field is added to the DCI to indicate the value of K. When the DCI field is 00, it indicates that K=2, namely, two consecutive time units. When the DCI field is 01, it indicates K=4, namely, four consecutive time units. When the DCI field is 10, it indicates K=6, namely, six consecutive time units. When the DCI field is 11, it indicates K=8, namely, eight consecutive time units.

TABLE 2

| Value of the quantity K of a plurality of time units indicated by a newly added field in DCI | |
| --- | --- |
| Newly added DCI field (two bits) | Value of K |
| 00 | 2 |
| 01 | 4 |
| 10 | 6 |
| 11 | 8 |

Manner 2.2

A redundant state of a field in the DCI is reused, to indicate the quantity of K time units, namely, the value of K. For example, 6 and 7 in Table 7.3.1.1.2-8 in the TR 38.213 protocol that indicate code division multiplexing of an antenna port used for sending an SRS are used as redundant states, and the two redundant states may be used to respectively indicate two values of K. For example, when the redundant state is 6, it indicates that K=2, namely, two consecutive time units. When the redundant state is 7, it indicates that K=5, namely, five consecutive time units.

Manner 2.3

An existing field in the DCI is reused, to indicate the quantity of K time units. For example, a value of an MCS may be used to indicate the value of K in an associated manner. An associated value table may be preconfigured. For example, a correspondence between a valid MCS index value and a quantity of time units for joint channel estimation may be that shown in the following Table 3.

TABLE 3

| Valid MCS index value | Quantity of time units for performing joint channel estimation |
| --- | --- |
| 0 to 9 | 4 |
| 10 to 16 | 2 |
| 17 to 27 | 1 |

Segments 0 to 9, 10 to 16, and 17 to 27 of valid MCS index values in Table 3 are merely examples, and may alternatively be other segment values. This is not limited herein.

Alternatively, a correspondence preset by the terminal is that shown in the following Table 4.

When a modulation order corresponding to an MCS is 2, it indicates that current channel quality is normal, and more time units are required for performing joint channel estimation. In this case, it indicates that the value of K is 6.

When a modulation order corresponding to an MCS is 6, it indicates that current channel quality is good, and only a small quantity of time units are required for performing joint channel estimation. In this case, it indicates that the value of K is 2.

When a modulation order corresponding to an MCS is 4, it indicates that the value of K is 4.

TABLE 4

| Modulation order | Quantity of time units for performing joint channel estimation |
| --- | --- |
| 2 | 4 |
| 4 | 2 |
| 6 | 1 |

To be specific, the terminal may first determine, based on the MCS index value, the modulation order indicated by the MCS index value, and then determine, based on the correspondence between the modulation order and the quantity of time units for performing joint channel estimation, the quantity, of time units for performing joint channel estimation, corresponding to the modulation order indicated by the MCS index value. For example, Table 2 is used as an example. Assuming that the MCS index value included in the DCI that is sent by the network side device and that is received by the terminal is 11, the terminal determines, based on the correspondence shown in Table 2, that the quantity, of time units for performing joint channel estimation, corresponding to the MCS index value 11 is 2. In this case, the terminal performs transmission of the SRS based on the determined quantity of time units for performing joint channel estimation and a determined quantity of times of repeated transmission.

Manner 3

An indication field is first configured in the RRC signaling, to indicate the value of the K consecutive time units, and then an indication field is configured in the DCI, to indicate a quantity of consecutive time units that need to change based on the value. For example, a reference value of the quantity K of time units for performing joint channel estimation is configured as 5 by using the RRC signaling, and a field (for example, two bits) in the DCI is used to indicate a changed value quantity (for example, −2, −1, 1, and 2), to determine the value of the final quantity K of time units for joint estimation. The field in the DCI may be a newly added field, or may be a reused redundant field in the DCI.

Signaling overheads of the DCI can be reduced by reusing the redundant field in the DCI, so that power consumption of the terminal device is reduced.

After receiving the first indication information, the terminal device performs joint uplink sending in the K consecutive time units, to be specific, ensures the same transmit power, the same antenna port, the same frequency domain resource, and the like, to enable the network side to perform joint channel estimation on the reference signals received in the K time units. Compared with an uplink transmission channel estimation method in a single time unit, joint channel estimation performed in the K consecutive time units can estimate a channel parameter more accurately. In this way, the network device can schedule uplink and downlink transmission resources more appropriately, and uplink transmission efficiency is improved.

S320: Send fourth indication information, to indicate first transmit power of the SRS.

When performing joint channel estimation in the K consecutive time units for uplink transmission, the network device needs to indicate the terminal device to send the SRS to the network device in the K consecutive time units at same power (namely, the first transmit power).

A manner in which the network device configures transmit power of the SRS in the K consecutive time units may be configuring a same power control parameter for the SRS in the K consecutive time units. Alternatively, the power control parameter may be configured for an SRS in the first time unit, no power control parameter is configured for an SRS in subsequent K−1 adjacent time units, and the network device indicates the terminal device to reuse the power control parameter in the first time unit. This is not specifically limited in this application.

A field related to the power parameter in the DCI includes a TPC-command, used to indicate closed-loop adjustment power for uplink transmission in a current time unit; and an SRI field, used to indicate the terminal device to determine target receive power from a target receive power set configured by using the higher layer signaling in the current time unit, where there is a mapping relationship between the SRI field and a related index value of the target receive power configured by using the higher layer signaling.

For example, that the network device does not configure the power control parameter for the SRS in the subsequent K−1 consecutive time units may be that the network device does not configure the TPC-command field in the DCI for the SRS in the subsequent K−1 consecutive time units, or may be that the network device configures the TPC-command field in the DCI for the SRS in the subsequent K−1 consecutive time units, but the field is used to indicate the terminal device to perform other scheduling.

For example, that the network device does not configure the power control parameter for the SRS in the subsequent K−1 consecutive time units may alternatively be that the network device does not configure the SRI field in the DCI for the SRS in the subsequent K−1 consecutive time units, or may be that the network device configures the SRI field in the DCI for the SRS in the subsequent K−1 consecutive time units, but the field is used to indicate the terminal device to perform other scheduling.

In the foregoing manner in which the network device configures the power control parameter for the SRS in the K consecutive time units, corresponding power control indication fields in the DCI can be greatly reduced. In addition, after the network device receives SRSs at same power in the K consecutive time units, an uplink transmission channel in the K consecutive time units may be estimated. Compared with uplink transmission channel estimation in a single time unit, the channel estimation value is more accurate, so that more accurate uplink and downlink transmission scheduling can be performed.

S330: Send fifth indication information, sixth indication information, and seventh indication information, to indicate a space-time-frequency resource of the SRS.

During uplink transmission, the network device indicates the terminal device to perform transmission in the K consecutive time units by using a same SRS. To be specific, the SRSs in the K consecutive time units have same transmit power, a same frequency domain resource configuration, and a same associated antenna port, to ensure that transmission of the SRSs in the K consecutive time units is performed on a same link.

As described above, for the antenna port of the uplink reference signal, the transmit port of the uplink reference signal may be selected by using the index indication in the SRI. For example, the DCI indicates that the SRS in each of the K time units is sent by using the first antenna port, to ensure that transmission of the SRSs in the K consecutive time units is performed on a same link.

A manner in which the network device indicates a time-frequency resource of the SRS may be directly configuring the SRSs in the K consecutive time units by using the RRC signaling (Manner 1 for short below), or may be configuring an SRS for reference by using the RRC signaling and then dynamically indicating SRSs in remaining K−1 time units by using the DCI (Manner 2 for short below), or may be configuring the SRSs in the K consecutive time units by using the DCI (Manner 3 for short below).

For the time-frequency resource, namely, a time domain resource and a frequency domain resource of the SRSs, the time domain resource may be a quantity of time domain symbols and a start position of the time domain symbol, and the frequency domain resource may be a frequency of a subcarrier and/or an offset of the frequency of the subcarrier.

Manner 1

In the RRC signaling, parameters related to the SRS configuration include:

SRS-Resource::resourceMapping::nrofSymbols, indicating the quantity of time domain symbols occupied by the SRS in the current time unit; and SRS-Resource::resourceMapping::startPosition, indicating the start position of the time domain symbol occupied by the SRS configured in the current time unit. Generally, the time domain symbols occupied by the SRS are located in the last six symbols in a slot.

For example, K=5 is configured, to be specific, the network device configures uplink SRSs in five consecutive time units. For example, SRS-Resource::resourceMapping::nrofSymbols={2, 0, 2, 0, 2}. To be specific, SRSs in the first, third, and fifth time units each occupy two time domain symbols, and no SRS is configured in the second and fourth time units. SRS-Resource::resourceMapping::startPosition={1, 0, 1, 0, 1} indicates that time domain symbols occupied by the SRS in the first, third, or fifth time unit start from the second time domain symbol of the last six time domain symbols, and time domain symbols occupied by SRS in the second or fourth time unit start from the first time domain symbol of the last six time domain symbols. The network device estimates, by using the SRSs in the five time units, a radio channel in a time period corresponding to the five time units.

In addition, frequency domain resources of uplink SRSs in the five consecutive time units need to be configured. For example, the frequency domain resources of the uplink SRSs in the five time units may be configured to be the same, or the frequency domain resources for the uplink SRSs in the five time units may be configured to be different. For example, a value of SRS-Resource::transmissionComb configured by the network device in any time unit may be configured as comb2, comb4, or any subcarrier offset, or the value of SRS-Resource::transmissionComb in all the five time units may be configured as comb2, comb4, or any subcarrier offset. This is not specifically limited in this application.

Manner 2

A reference SRS time-frequency resource is configured in the RRC signaling, and then SRSs in remaining K−1 time units are dynamically indicated by using the DCI. For example, SRS-Resource::resourceMapping::nrofSymbols is configured as 2, and Resource::resourceMapping::startPosition is configured as 1.

Then, a 3-bit DCI index value is used to indicate a quantity of time domain symbols that need to be newly added or reduced based on the RRC signaling configuration and that are occupied by the SRS in the current time unit. For example, in the following predefined table shown in Table 5, the quantity of time domain symbols in the remaining K−1 time units is indicated by using the index value.

For example, when the index value in the DCI is 000, it indicates that, compared with a quantity of time domain symbols for the SRS in a reference time unit, one symbol is newly added to the quantity of time domain symbols for the SRS in the current time unit. For example, if a quantity of time domain symbols that are configured by using the RRC signaling and that are used for a reference SRS is 2, and an index value of the DCI in the current time unit is configured by the network device as 000, it indicates that the quantity of time domain symbols for the SRS in the current time unit is 3. When the index value in the DCI is 100, it indicates that, compared with a quantity of time domain symbols for the SRS in a reference time unit, one symbol is reduced from the quantity of time domain symbols for the SRS in the current time unit. For example, if a quantity of time domain symbols that are configured by using the RRC signaling and that are used for a reference SRS is 2, and an index value of the DCI in the current time unit is configured by the network device as 100, it indicates that the quantity of time domain symbols for the SRS in the current time unit is 1.

TABLE 5

| DCI index value indicating a quantity of to-be-added or to-be-reduced time domain symbols | |
| --- | --- |
| DCI index | Quantity change |
| 000 | 1 |
| 001 | 2 |
| 010 | 3 |
| 011 | 4 |
| 100 | −1 |
| 101 | −2 |
| 110 | −3 |
| 111 | −4 |

The field of the DCI index value may be a newly added field, or may be a reused redundant field in the DCI. If the redundant field is reused, signaling overheads in the DCI are lower.

Manner 3

Configuring, by using the DCI, the quantity of time domain symbols for the SRS in the K consecutive time units means configuring, by using a field that is in the DCI and that is used to indicate a time domain symbol for the SRS, a quantity of symbols occupied by the SRS in the current time unit, and the field may be two bits or three bits.

For example, the network device configures a 2-bit field that is in the DCI in the first time unit and that indicates a time domain symbol for the SRS as 00, and this indicates that no SRS is configured in the current time unit. The network device configures a 2-bit field that is in the DCI in the second time unit and that indicates a time domain symbol for the SRS as 01, and this indicates that a quantity of time domain symbols for the SRS configured in the current time unit is 1. The network device configures a 2-bit field that is in the DCI in the second time unit and that indicates a time domain symbol for the SRS as 10, and this indicates that a quantity of time domain symbols for the SRS configured in the current time unit is 2. The network device configures a 2-bit field that is in the DCI in the second time unit and that indicates a time domain symbol for the SRS as 11, and this indicates that a quantity of time domain symbols for the SRS configured in the current time unit is 3.

The field that is in the DCI and that is used to indicate the time domain symbol for the SRS may be a newly added field, or may be a reused redundant field in the DCI. The redundant field is reused, so that DCI indication overheads can be reduced.

In this configuration manner, the network device may configure the uplink reference signal for each time unit. As required, the network device may not configure the uplink reference signal in a part of time units, to reduce overheads of the uplink reference signal.

S340: Send the SRS for joint channel estimation.

After determining the transmit parameter and the time domain resource of the SRS, the terminal device sends the SRS to the network device based on the indication information. After receiving the SRS, the network device performs joint channel estimation in the K consecutive time units.

According to the technical solution provided in this embodiment of this application, the network device may perform channel estimation on the uplink transmission channel in the K consecutive time units, so that the estimated value is more accurate than the uplink transmission channel estimation value for the single time unit. In this way, the network device can perform more appropriate uplink and downlink transmission scheduling, to improve uplink transmission efficiency of the terminal device.

It should be noted that a sequence of the foregoing steps is not specifically limited in this application. The network device may indicate the transmit parameter for the uplink reference signal during joint channel estimation, or may predefine, according to a protocol, the transmit parameter for the uplink reference signal during joint channel estimation. This is not specifically limited in this application.

Figure 4:
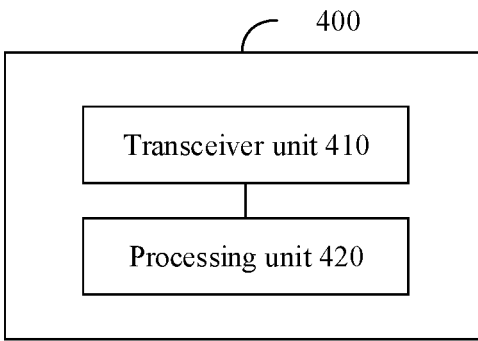
FIG. 4 is a schematic block diagram of a wireless communication apparatus according to an embodiment of this application.

FIG. 4 is a schematic block diagram of a wireless communication apparatus according to an embodiment of this application. The wireless communication apparatus 400 includes a transceiver unit 410 and a processing unit 420. The transceiver unit 410 may perform external communication, and the processing unit 420 is configured to process data. The transceiver unit 410 may also be referred to as a communication interface or a communication unit.

Optionally, the wireless positioning apparatus 400 may further include a storage unit. The storage unit may be configured to store instructions and/or data. The processing unit 420 may read the instructions and/or the data in the storage unit.

The wireless positioning apparatus 400 may be configured to perform actions performed by the terminal device in the foregoing method embodiments. In this case, the wireless positioning apparatus 400 may be the terminal device or a component that may be disposed in the terminal device. The transceiver unit 410 is configured to perform transceiver-related operations on a terminal device side in the foregoing method embodiments. The processing unit 420 is configured to perform processing-related operations on the terminal device side in the foregoing method embodiments.

Alternatively, the wireless positioning apparatus 400 may be configured to perform actions performed by the network device in the foregoing method embodiments. In this case, the wireless positioning apparatus 400 may be the network device or a component that may be disposed in the network device. The transceiver unit 410 is configured to perform transceiver-related operations on a network device side in the foregoing method embodiments. The processing unit 420 is configured to perform processing-related operations on the network device side in the foregoing method embodiments.

In a design, the wireless positioning apparatus 400 is configured to perform the actions of the network device in the embodiment shown in FIG. 2 or FIG. 3. The transceiver unit 410 is configured to send first indication information to a terminal device, where the first indication information is used to indicate K consecutive time units, K is an integer greater than or equal to 2, and uplink data carried in at least two of the K time units is different; and is further configured to receive a first uplink reference signal from the terminal device in at least one of the K time units. The processing unit 420 is configured to perform joint channel estimation in the K time units based on the first uplink reference signal.

Optionally, the first indication information includes information about a first modulation and coding scheme MCS, a value of K is a value that is indicated by a first mapping relationship and that corresponds to the first MCS, and the first mapping relationship is used to indicate a correspondence between a value of the MCS and the value of K.

Optionally, the transceiver unit 410 is further configured to: before sending the first indication information to the terminal device, send second indication information to the terminal device, where the second indication information is used to indicate a value M, M is an integer greater than or equal to 2, and the second indication information is carried in higher layer signaling; and send downlink control information DCI to the terminal device, where the DCI includes first offset information, and the value of K is determined based on the first offset information and M.

Optionally, the transceiver unit 410 is further configured to send third indication information to the terminal device, where the third indication information is used to indicate a time unit that is in the K time units and that carries an uplink reference signal; or the third indication information is used to indicate a time unit that is in the K time units and that does not carry an uplink reference signal.

Optionally, the at least two of the K time units carry the first uplink reference signal; and transmit parameters of uplink reference signals corresponding to the at least two time units are the same, and the transmit parameter includes at least one of the following parameters: transmit power, an antenna port, or a frequency domain resource.

Optionally, the transceiver unit 410 is further configured to send fourth indication information to the terminal device, where the fourth indication information is used to indicate first transmit power, and the first transmit power is transmit power of the first uplink reference signal.

Optionally, the transceiver unit 410 is further configured to send fifth indication information to the terminal device, where the fifth indication information is used to indicate a first antenna port, and the first antenna port is a transmit port of the first uplink reference signal.

Optionally, the transceiver unit 410 is further configured to send sixth indication information to the terminal device, where the sixth indication information is used to indicate a first frequency domain resource, and the first frequency domain resource is a frequency domain resource that carries the first uplink reference signal.

Optionally, the transceiver unit 410 is further configured to send seventh indication information to the terminal device, where the seventh indication information is used to indicate a quantity of first symbols in the time unit that carries the first uplink reference signal, and the first symbol is a symbol used to carry the reference signal.

Optionally, positions of the K time units may be K consecutive time units after a first time unit, or may be K consecutive time units after a second unit. The first time unit is a time unit that carries the first indication information, the second time unit and the first time unit are separated by N time units, and N is predefined or is configured by the network device, for example, configured by using RRC signaling.

Optionally, the first transmit power is uplink signal transmit power used in each of the K time units.

Optionally, the seventh indication information includes second offset information, the second offset information is used to indicate an offset of the quantity of first symbols relative to a quantity of reference symbols, and the quantity of reference symbols is indicated by the network device, or the quantity of reference symbols is specified in a communication protocol.

Optionally, the quantity of reference symbols is a quantity of symbols that are used to carry an uplink reference signal in a $j^{th}$ time unit in the K time units, and the $j^{th}$ time unit is any one of the K time units.

Optionally, a part of the K time units carry an uplink reference signal.

In another design, the wireless positioning apparatus 400 is configured to perform the actions of the terminal device in the embodiment shown in FIG. 2 or FIG. 3. The transceiver unit 410 is configured to receive first indication information from a network device, where the first indication information is used to indicate K consecutive time units, K is an integer greater than or equal to 2, at least one of the K time units is used to carry an uplink reference signal, and the uplink reference signal is used for joint channel estimation in the K time units. The transceiver unit 410 is further configured to send a first uplink reference signal in the at least one of the K time units, where uplink data carried in at least two of the K time units is different.

Optionally, the at least two of the K time units carry the first uplink reference signal; and transmit parameters corresponding to uplink reference signals carried in the at least two time units are the same, and the transmit parameter includes at least one of the following parameters: transmit power, an antenna port, or a frequency domain resource.

Optionally, the K time units are K consecutive time units starting from a first time unit; or the K time units are K consecutive time units starting from a second time unit, and the second time unit and the first time unit are separated by N time units.

Optionally, the transceiver unit 410 is further configured to: before receiving the first indication information from the network device, receive second indication information from the network device, where the second indication information is used to indicate a value M, M is an integer greater than or equal to 2, the second indication information is carried in higher layer signaling, the first indication information includes first offset information, and a value of K is determined based on the first offset information and M.

Optionally, the transceiver unit 410 is further configured to receive third indication information from the network device, where the third indication information is used to indicate a time unit that is in the K time units and that carries an uplink reference signal; or the third indication information is used to indicate a time unit that is in the K time units and that does not carry an uplink reference signal.

Optionally, the transceiver unit 410 is further configured to receive fourth indication information from the network device, where the fourth indication information is used to indicate first transmit power, and the first transmit power is transmit power of the first uplink reference signal.

Optionally, the transceiver unit 410 is further configured to receive fifth indication information from the network device, where the fifth indication information is used to indicate a first antenna port, and the first antenna port is a transmit port of the first uplink reference signal.

Optionally, the transceiver unit 410 is further configured to receive sixth indication information from the network device, where the sixth indication information is used to indicate a first frequency domain resource, and the first frequency domain resource is a frequency domain resource that carries the first uplink reference signal.

Optionally, the transceiver unit 410 is further configured to receive seventh indication information from the network device, where the seventh indication information is used to indicate a quantity of first symbols in the time unit that carries the first uplink reference signal, and the first symbol is a symbol used to carry the reference signal.

The processing unit 420 in FIG. 4 may be implemented by a processor or a processor-related circuit. The transceiver unit 410 may be implemented by a transceiver or a transceiver-related circuit. The transceiver unit 410 may also be referred to as a communication unit or a communication interface. The storage unit may be implemented by a memory.

Figure 5:
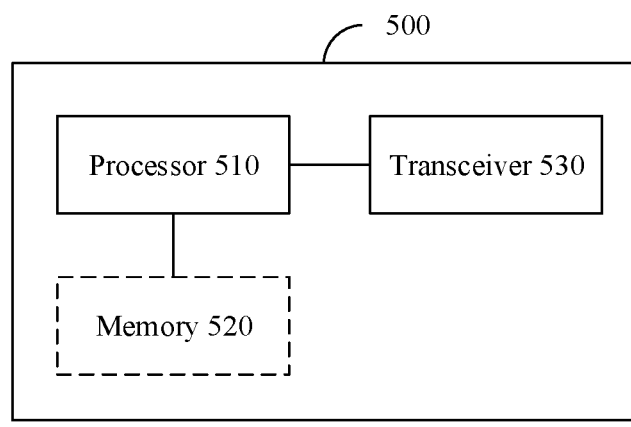
FIG. 5 is another schematic block diagram of a wireless communication apparatus according to an embodiment of this application.

As shown in FIG. 5, an embodiment of this application further provides a wireless communication apparatus 500. The wireless communication apparatus 500 includes a processor 510. The processor 510 is coupled to a memory 520. The memory 520 is configured to store a computer program or instructions and/or data. The processor 510 is configured to execute the computer program or the instructions and/or the data stored in the memory 520, so that the method in the foregoing method embodiments is performed.

Optionally, the wireless communication apparatus 500 includes one or more processors 510.

Optionally, as shown in FIG. 5, the wireless communication apparatus 500 may further include a memory 520.

Optionally, the wireless communication apparatus 500 may include one or more memories 520.

Optionally, the memory 520 and the processor 510 may be integrated together, or disposed separately.

Optionally, as shown in FIG. 5, the wireless communication apparatus 500 may further include a transceiver 530. The transceiver 530 is configured to receive and/or send a signal. For example, the processor 510 is configured to control the transceiver 530 to receive and/or send a signal.

In a solution, the wireless communication apparatus 500 is configured to implement operations performed by the terminal device in the foregoing method embodiments.

For example, the processor 510 is configured to implement processing-related operations performed by the terminal device in the foregoing method embodiments, and transceiver 530 is configured to implement transceiver-related operations performed by the terminal device in the foregoing method embodiments.

In another solution, the wireless communication apparatus 500 is configured to implement operations performed by the network device in the foregoing method embodiments.

For example, the processor 510 is configured to implement processing-related operations performed by the network device in the foregoing method embodiments, and transceiver 530 is configured to implement transceiver-related operations performed by the network device in the foregoing method embodiments.

Figure 6:
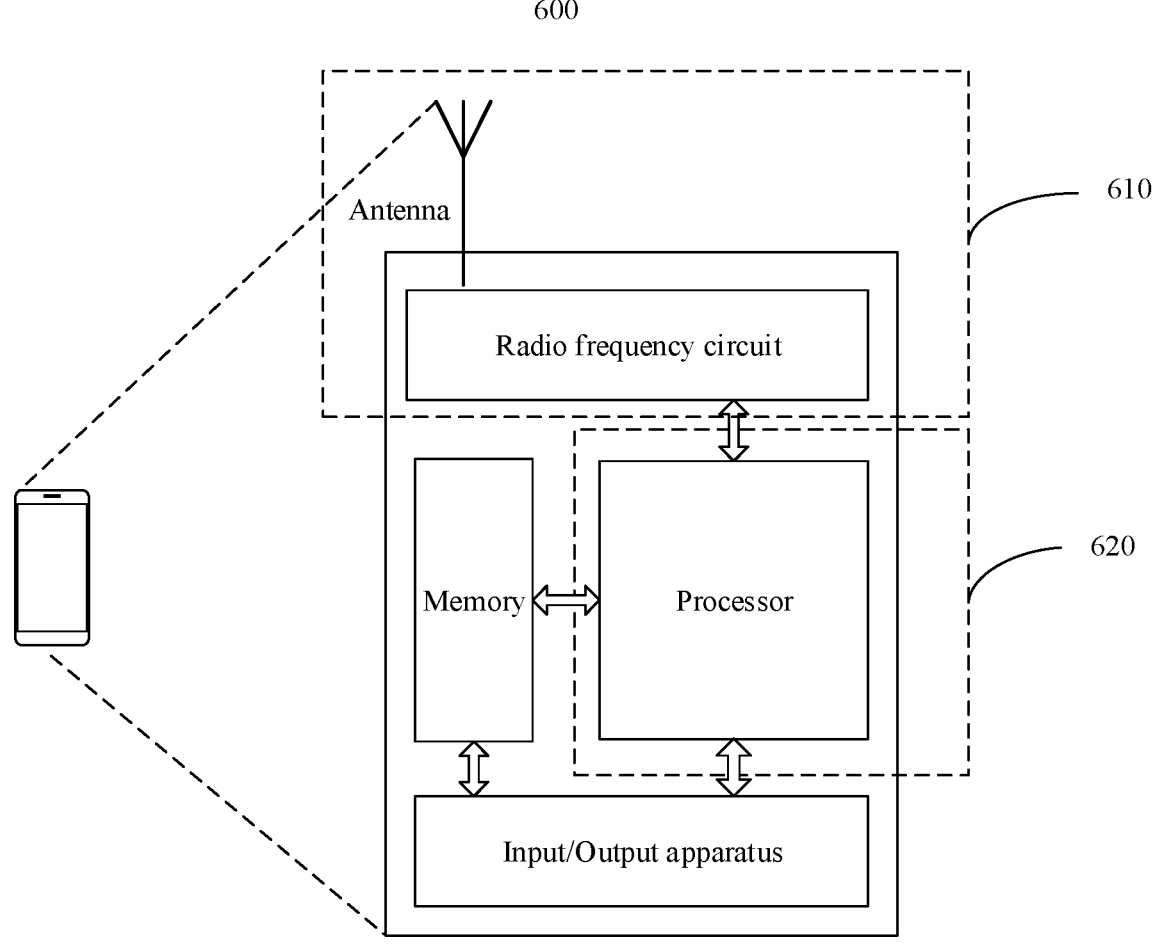
FIG. 6 is a schematic block diagram of a terminal device according to an embodiment of this application.

An embodiment of this application further provides a wireless communication apparatus 600. The wireless communication apparatus 600 may be a terminal device or a chip. The wireless communication apparatus 600 may be configured to perform operations performed by the terminal device in the foregoing method embodiments. When the wireless communication apparatus 600 is a terminal device, FIG. 6 is a simplified schematic diagram of a structure of the terminal device. For ease of understanding and illustration, in FIG. 6, the terminal device is, for example, a mobile phone. As shown in FIG. 6, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is configured to store the software program and the data. The radio frequency circuit is mainly configured to: perform conversion between a baseband signal and a radio frequency signal and process the radio frequency signal. The antenna is mainly configured to receive and send the radio frequency signal in a form of an electromagnetic wave. The input/output apparatus such as a touchscreen, a display screen, or a keyboard is mainly configured to: receive data entered by a user, and output data to the user. It should be noted that terminal devices of some types may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device.

As shown in FIG. 6, the terminal device includes a transceiver unit 610 and a processing unit 620. The transceiver unit 610 may also be referred to as a transceiver, a transceiver machine, a transceiver apparatus, or the like. The processing unit 620 may also be referred to as a processor, a processing board, a processing module, a processing apparatus, or the like.

Optionally, a component that is in the transceiver unit 610 and that is configured to implement the receiving function may be considered as a receiving unit, and a component that is in the transceiver unit 610 and that is configured to implement the sending function may be considered as a sending unit. In other words, the transceiver unit 610 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 610 is configured to perform receiving operations of the terminal device in FIG. 2 and FIG. 3. The processing unit 620 is configured to perform processing actions on the terminal device side in FIG. 2 and FIG. 3.

It should be understood that FIG. 6 is merely an example instead of a limitation. The terminal device including the transceiver unit and the processing unit may not depend on the structure shown in FIG. 6.

When the wireless communication apparatus 600 is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a wireless communication apparatus 700. The wireless communication apparatus 700 may be a network device or a chip. The wireless communication apparatus 700 may be configured to perform operations performed by the network device in the foregoing method embodiments.

Figure 7:
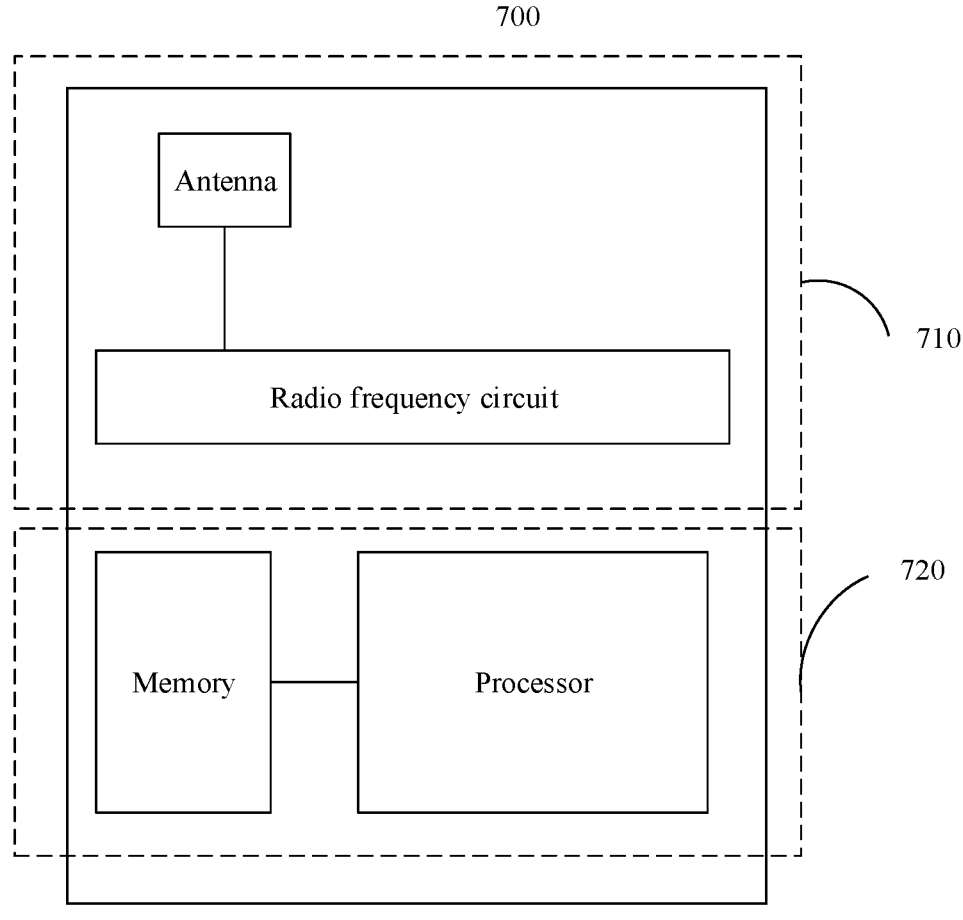
FIG. 7 is a schematic block diagram of a network device according to an embodiment of this application.

When the wireless communication apparatus 700 is a network device, for example, a base station, FIG. 7 is a simplified schematic diagram of a structure of a base station. The base station includes a part 710 and a part 720. The part 77 is mainly configured to receive and send a radio frequency signal, and perform conversion between the radio frequency signal and a baseband signal. The part 720 is mainly used for baseband processing, base station control, and the like. The part 710 may be usually referred to as a transceiver unit, a transceiver machine, a transceiver circuit, a transceiver, or the like. The part 720 is usually a control center of the base station, may be usually referred to as a processing unit, and is configured to control the base station to perform processing operations on a network device side in the foregoing method embodiments.

The transceiver unit in the part 710 may also be referred to as a transceiver machine, a transceiver, or the like. The transceiver unit includes an antenna and a radio frequency circuit. The radio frequency circuit is mainly configured to perform radio frequency processing. Optionally, a component that is in the part 710 and that is configured to implement a receiving function may be considered as a receiving unit, and a component configured to implement a sending function may be considered as a sending unit. In other words, the part 710 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 720 may include one or more boards, and each board may include one or more processors and one or more memories. The processor is configured to read and execute a program in the memory to implement a baseband processing function and control the base station. If there are a plurality of boards, the boards may be interconnected with each other to enhance a processing capability. In an optional implementation, the plurality of boards may share one or more processors, the plurality of boards may share one or more memories, or the plurality of boards may simultaneously share one or more processors.

For example, in an implementation, the transceiver unit in the part 710 is configured to perform transceiver-related steps performed by the network device in the embodiments shown in FIG. 2 and FIG. 3. The part 720 is configured to perform processing-related steps performed by the network device in the embodiments shown in FIG. 2 and FIG. 3.

It should be understood that FIG. 7 is merely an example instead of a limitation. The network device including the transceiver unit and the processing unit may not depend on the structure shown in FIG. 7.

When the wireless communication apparatus 700 is a chip, the chip includes a transceiver unit and a processing unit. The transceiver unit may be an input/output circuit or a communication interface. The processing unit is a processor, a microprocessor, or an integrated circuit that is integrated on the chip.

An embodiment of this application further provides a computer-readable storage medium. The computer-readable storage medium stores computer instructions used to implement the method performed by the terminal device or the method performed by the network device in the foregoing method embodiments.

For example, when the computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

In an example, the communication system includes the network device and the terminal device in the embodiments described above with reference to FIG. 2 and FIG. 3.

For explanations and beneficial effects of related content of any wireless communication apparatus provided above, refer to the corresponding method embodiments provided above. Details are not described herein again.

In embodiments of this application, the terminal device or the network device may include a hardware layer, an operating system layer running on the hardware layer, and an application layer running on the operating system layer. The hardware layer may include hardware such as a central processing unit (CPU), a memory management unit (MMU), and a memory (which is also referred to as a main memory). An operating system of the operating system layer may be any one or more computer operating systems that implement service processing by using a process, for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

Aspects or features of this application may be implemented as a method, an apparatus or a product that uses standard programming and/or engineering technologies. The term "product" used in this specification may cover a computer program that can be accessed from any computer-readable component, carrier or medium. For example, a computer-readable medium may include but is not limited to: a magnetic storage device (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel, and various other media that can store, contain, and/or carry instructions and/or data.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, or another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units. To be specific, the components may be located at one position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   sending first indication information to a terminal device, wherein the first indication information is used to indicate K time units for reference signal transmission by the terminal device, K is an integer greater than or equal to 2, and uplink data carried in at least two of the K time units is different, wherein the K time units are consecutive time units;
   receiving at least one first uplink reference signal from the terminal device in the K time units; and
   performing joint channel estimation in the K time units based on the at least one first uplink reference signal.

2. The wireless communication method according to claim 1, wherein each of the at least two of the K time units carries a first uplink reference signal of the at least one first uplink reference signal;

wherein transmit parameters of the first uplink reference signals corresponding to the at least two of the K time units are the same, and the transmit parameters comprise at least one of the following parameters: a transmit power, an antenna port, or a frequency domain resource; and wherein the joint channel estimation in the K time units is performed based on the first uplink reference signals of the at least one first uplink reference signal.

3. The wireless communication method according to claim 1, wherein the sending the first indication information to the terminal device comprises:

sending the first indication information to the terminal device in a first time unit;

wherein:

the K time units are K consecutive time units starting from the first time unit, or the K time units are K consecutive time units starting from a second time unit, and the second time unit and the first time unit are separated by N time units.

4. The wireless communication method according to claim 1, wherein the sending the first indication information to the terminal device comprises:

sending downlink control information (DCI) to the terminal device, wherein the downlink control information comprises information about a first modulation and coding scheme (MCS), the information about the first MCS is the first indication information, and the first MCS corresponds to a value of K.

5. The wireless communication method according to claim 1, wherein before the sending the first indication information to the terminal device, the method further comprises:

sending second indication information to the terminal device by using higher layer signaling, wherein the second indication information is used to indicate a value M, and M is an integer greater than or equal to 2; and wherein the sending the first indication information to the terminal device comprises:

sending the DCI to the terminal device, wherein the DCI comprises first offset information, and the value of K is determined based on the first offset information and M.

6. The wireless communication method according to claim 1, wherein a portion of time units of the K time units carry an uplink reference signal of the at least one uplink reference signal.

7. The wireless communication method according to claim 1, wherein the method further comprises:

sending third indication information to the terminal device;

wherein:

the third indication information is used to indicate a time unit that is in the K time units and that carries an uplink reference signal, or the third indication information is used to indicate a time unit that is in the K time units and that does not carry an uplink reference signal.

8. A wireless communication method, comprising:

receiving first indication information from a network device, wherein the first indication information is used to indicate K time units for reference signal transmission by the terminal device, K is an integer greater than or equal to 2, the K time units are used to carry at least one uplink reference signal, and the at least one uplink reference signal is used for joint channel estimation in the K time units, wherein the K time units are consecutive time units; and sending at least one first uplink reference signal in the K time units, wherein uplink data carried in at least two of the K time units is different.

9. The wireless communication method according to claim 8, wherein each of the at least two of the K time units carries a first uplink reference signal of the at least one first uplink reference signal;

wherein transmit parameters corresponding to the first uplink reference signals carried in the at least two of the K time units are the same, and the transmit parameters comprise at least one of the following parameters: a transmit power, an antenna port, or a frequency domain resource; and wherein a joint channel estimation in the K time units is performed based on the first uplink reference signals of the at least one first uplink reference signal.

10. The wireless communication method according to claim 8, wherein the receiving the first indication information from the network device comprises:

receiving the first indication information from the network device in a first time unit;

wherein:

the K time units are K consecutive time units starting from the first time unit, or the K time units are K consecutive time units starting from a second time unit, and the second time unit and the first time unit are separated by N time units.

11. The wireless communication method according to claim 8, wherein the receiving the first indication information from the network device comprises:

receiving downlink control information (DCI) from the network device, wherein the downlink control information comprises information about a first modulation and coding scheme (MCS), the information about the first MCS is the first indication information, and the first MCS corresponds to a value of K.

12. The wireless communication method according to claim 8, wherein before the receiving the first indication information from the network device, the method further comprises:

receiving second indication information from the network device by using higher layer signaling, wherein the second indication information is used to indicate a value M, and M is an integer greater than or equal to 2; and wherein the receiving the first indication information from the network device comprises:

receiving the DCI from the network device, wherein the DCI comprises first offset information, and the value of K is determined based on the first offset information and M.

13. The wireless communication method according to claim 8, wherein a portion of time units of the K time units carry an uplink reference signal of the at least one uplink reference signal.

14. The wireless communication method according to claim 8, wherein the method further comprises:

receiving third indication information from the network device;

wherein:

the third indication information is used to indicate a time unit that is in the K time units and that carries an uplink reference signal, or the third indication information is used to indicate a time unit that is in the K time units and that does not carry an uplink reference signal.

15. A wireless communication apparatus, comprising:

one or more memories configured to store instructions; and one or more processors coupled to the one or more memories and configured to execute the instructions to cause the wireless communication apparatus to:

send first indication information to a terminal device, wherein the first indication information is used to indicate K time units for reference signal transmission by the terminal device, K is an integer greater than or equal to 2, and uplink data carried in at least two of the K time units is different, wherein the K time units are consecutive time units;

receive at least one first uplink reference signal from the terminal device in at least one of the K time units; and perform joint channel estimation in the K time units based on the at least one first uplink reference signal.

16. The wireless communication apparatus according to claim 15, wherein each of the at least two of the K time units carries a first uplink reference signal of the at least one first uplink reference signal;

wherein executing the instructions further causes the wireless communication apparatus to:

transmit parameters of the first uplink reference signals corresponding to the at least two of the K time units are the same, and the transmit parameters comprise at least one of the following parameters: a transmit power, an antenna port, or a frequency domain resource; and wherein the joint channel estimation in the K time units is performed based on the first uplink reference signals of the at least one first uplink reference signal.

17. The wireless communication apparatus according to claim 15, wherein the sending the first indication information to the terminal device comprises:

sending the first indication information to the terminal device in a first time unit;

wherein:

the K time units are K consecutive time units starting from the first time unit or the K time units are K consecutive time units starting from a second time unit, and the second time unit and the first time unit are separated by N time units.

18. The wireless communication apparatus according to claim 15, wherein the sending the first indication information to the terminal device comprises:

sending downlink control information (DCI) to the terminal device, wherein the downlink control information comprises information about a first modulation and coding scheme (MCS), the information about the first MCS is the first indication information, and the first MCS corresponds to a value of K.

19. The wireless communication apparatus according to claim 15, wherein executing the instructions further causes the wireless communication apparatus to:

send second indication information to the terminal device by using higher layer signaling, wherein the second indication information is used to indicate a value M, and M is an integer greater than or equal to 2; and wherein the sending the first indication information to the terminal device comprises:

sending the DCI to the terminal device, wherein the DCI comprises first offset information, and the value of K is determined based on the first offset information and M.

20. The wireless communication apparatus according to claim 15, wherein a portion of time units of the K time units carry an uplink reference signal, wherein executing the instructions further causes the wireless communication apparatus to:

send third indication information to the terminal device;

wherein:

the third indication information is used to indicate a time unit that is in the K time units and that carries an uplink reference signal, or the third indication information is used to indicate a time unit that is in the K time units and that does not carry an uplink reference signal.

* * * * *